United States Patent
Moon et al.

(10) Patent No.: US 10,144,657 B2
(45) Date of Patent: Dec. 4, 2018

(54) SYSTEM AND METHOD FOR FILTRATION

(71) Applicant: KOLON INDUSTRIES, INC., Gwacheon-si, Gyeonggi-do (KR)

(72) Inventors: Heewan Moon, Seoul (KR); Jungmin Noh, Seongnam-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 125 days.

(21) Appl. No.: 14/646,604

(22) PCT Filed: Nov. 4, 2013

(86) PCT No.: PCT/KR2013/009886
§ 371 (c)(1),
(2) Date: May 21, 2015

(87) PCT Pub. No.: WO2014/092337
PCT Pub. Date: Jun. 19, 2014

(65) Prior Publication Data
US 2015/0298996 A1    Oct. 22, 2015

(30) Foreign Application Priority Data
Dec. 14, 2012  (KR) .................. 10-2012-0145898

(51) Int. Cl.
*B01D 61/14* (2006.01)
*B01D 63/02* (2006.01)
(Continued)

(52) U.S. Cl.
CPC .............. *C02F 1/444* (2013.01); *B01D 61/14* (2013.01); *B01D 61/18* (2013.01); *B01D 61/22* (2013.01);
(Continued)

(58) Field of Classification Search
None
See application file for complete search history.

(56) References Cited

U.S. PATENT DOCUMENTS 5,248,424 A * 9/1993 Cote .................... B01D 61/142
210/321.69
7,537,701 B2   5/2009 Mahendran et al.
(Continued)

FOREIGN PATENT DOCUMENTS

| CN | 101108310 A | 1/2008 |
|---|---|---|
| CN | 201746409 U | 2/2011 |
| FR | 2 928 366 A1 | 9/2009 |
| JP | 2004-25111 A | 1/2004 |
| JP | 2004337730 A | 12/2004 |
| KR | 20-0343150 Y1 | 3/2004 |
| KR | 20-0365880 Y1 | 10/2004 |
| KR | 10-2006-0035887 A | 4/2006 |
| KR | 10-2006-0070718 A | 6/2006 |

OTHER PUBLICATIONS

International Searching Authority, International Search Report of PCT/KR2013/009886 dated Jan. 29, 2014.

*Primary Examiner* — Krishnan S Menon
*Assistant Examiner* — Ryan B Huang
(74) *Attorney, Agent, or Firm* — Sughrue Mion, PLLC (57) ABSTRACT

Disclosed are system and method for filtration capable of minimizing the energy consumption. The filtration system of the invention comprises a processing tank, a first pump for supplying a feed water to be treated to the processing tank, a filtering apparatus in the processing tank, and a second pump for providing the filtering apparatus with a negative pressure so that the filtering apparatus can treat the feed water to produce a permeate, wherein the processing tank is sealable so that the feed water in the processing tank can be pressurized by the first pump after the processing tank is filled with the feed water.

1 Claim, 9 Drawing Sheets

(51) Int. Cl.
| | |
|---|---|
| *B01D 69/08* | (2006.01) |
| *C02F 1/44* | (2006.01) |
| *B01D 61/18* | (2006.01) |
| *B01D 61/22* | (2006.01) |
| *B01D 63/04* | (2006.01) |
| *C02F 3/12* | (2006.01) |
| *C02F 103/00* | (2006.01) |
| *C02F 103/34* | (2006.01) |
| *C02F 103/42* | (2006.01) |

(52) U.S. Cl.
CPC ........... *B01D 63/02* (2013.01); *B01D 63/043* (2013.01); *B01D 69/08* (2013.01); *C02F 1/44* (2013.01); *B01D 2311/04* (2013.01); *B01D 2311/14* (2013.01); *B01D 2313/06* (2013.01); *B01D 2313/20* (2013.01); *B01D 2315/06* (2013.01); *C02F 3/1273* (2013.01); *C02F 2103/007* (2013.01); *C02F 2103/34* (2013.01); *C02F 2103/42* (2013.01); *Y02W 10/15* (2015.05)

(56) References Cited

U.S. PATENT DOCUMENTS

| | | | |
|---|---|---|---|
| 2003/0136746 A1* | 7/2003 | Behmann | B01D 61/18 210/771 |
| 2004/0188339 A1* | 9/2004 | Murkute | B01D 61/18 210/321.8 |
| 2007/0163942 A1* | 7/2007 | Tanaka | B01D 63/02 210/321.89 |
| 2009/0314706 A1* | 12/2009 | Kim | B01D 61/18 210/462 |
| 2011/0042311 A1 | 2/2011 | Ames | |
| 2011/0253627 A1* | 10/2011 | Lee | B01D 61/18 210/636 |

* cited by examiner

SYSTEM AND METHOD FOR FILTRATION

TECHNICAL FIELD

The present invention relates to system and method for filtration, and more particularly, to system and method for filtration capable of minimizing the energy consumption.

BACKGROUND ART

Separation methods for water treatment include a method using a filtering membrane, a method using heat or phase-change, and so on.

A separation method using a filtering membrane has a lot of advantages over the method using heat or phase-change. Among the advantages is the high reliability of water treatment since the water of desired purity can be easily and stably obtained by adjusting the size of the pores of the filtering membrane. Furthermore, since the separation method using a filtering membrane does not require a heating process, the method can be used together with microorganisms which are useful for separation process but might be adversely affected by heat.

Among the separation methods using a filtering membrane is a method using a hollow fiber membrane module comprising a bundle of hollow fiber membranes. Typically, a hollow fiber membrane module has been widely used in the field of microfiltration and/or ultrafiltration for obtaining axenic water, drinking water, super pure water, and so on. Recently, the application of the hollow fiber membrane module is extended to wastewater treatment, solid-liquid separation in a septic tank, removal of suspended solid (SS) from industrial wastewater, filtration of river, filtration of industrial water, filtration of swimming pool water, and the like.

A filtration system using hollow fiber membranes may be classified into a submerged-type filtration system and a pressurized-type filtration system according to the operation manner thereof.

Figure 1:
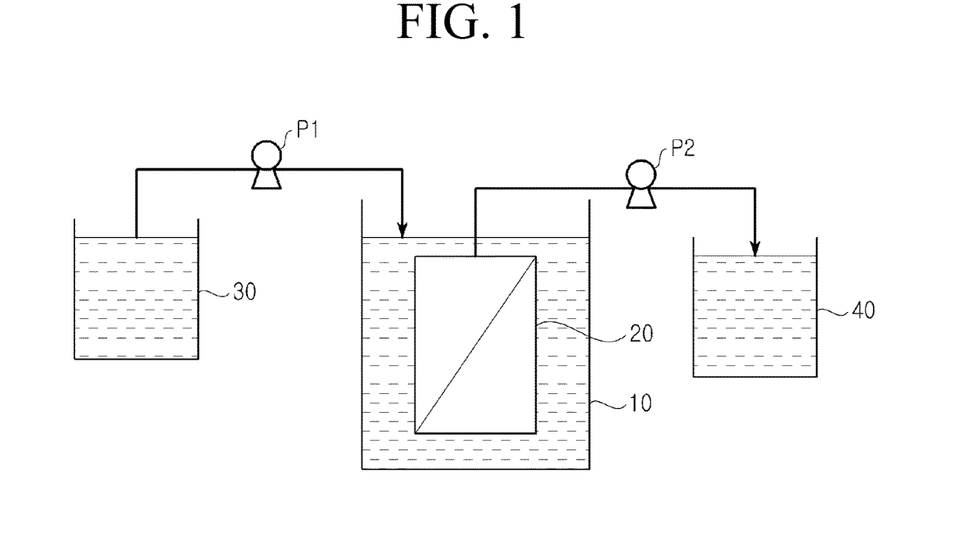
FIG. 1 schematically shows a filtration system of the prior art.

FIG. 1 schematically shows a submerged-type filtration system of the prior art.

As shown in FIG. 1, the submerged-type filtration system of the prior art comprises a processing tank 10. Typically, the processing tank 10 is disposed below the surface of the ground and is a open-type tank whose inside is exposed to the external environment through the upper portion thereof.

A filtering apparatus 20 is disposed in the processing tank. The filtering apparatus 20 comprises a plurality of hollow fiber membranes.

The feed water to be treated is supplied from the feed water tank 30 to the processing tank 10 by means of the first pump P1. The filtering apparatus 20 is sufficiently submerged into the feed water supplied from the feed water tank 30, and then the second pump P2 provides the filtering apparatus 20 with the negative pressure.

More particularly speaking, the lumen of the hollow fiber membrane of the filtering apparatus becomes a vacuum state as the negative pressure is applied thereto by the pump P2, which makes only the pure water other than the impurities (hereinafter, "permeate") pass through the hollow fiber membrane and enter the lumen thereof. Then, owing to the negative pressure continuously provided by the second pump P2, the permeate introduced in the lumen of the hollow fiber membrane is forwarded to the permeate tank 40.

According to the submerged-type filtration system of the prior art, however, the amount of the energy consumed by the second pump P2 for making the lumen of the hollow fiber membrane into a vacuum state and forwarding the permeate introduced in the lumen to the permeate tank 40 is enormous.

Thus, it is strongly required to find a way to reduce the amount of the energy for the operation of the submerged-type filtration system.

DISCLOSURE

Technical Problem

Therefore, the present invention is directed to system and method for filtration capable of preventing these limitations and drawbacks of the prior art.

An aspect of the present invention is to provide a filtration system capable of minimizing the energy consumption.

The other aspect of the present invention is to provide a filtration method capable of minimizing the energy consumption.

Additional aspects and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims.

Technical Solution

In accordance with the aspect of the present invention, there is provided a filtration system comprising: a processing tank; a first pump for supplying a feed water to be treated to the processing tank; a filtering apparatus in the processing tank; and a second pump for providing the filtering apparatus with a negative pressure so that the filtering apparatus can treat the feed water to produce a permeate, wherein the processing tank is sealable so that the feed water in the processing tank can be pressurized by the first pump after the processing tank is filled with the feed water.

In accordance with the other aspect of the present invention, there is provided a filtration method comprising: disposing a filtering apparatus in a processing tank; supplying a feed water to be treated to the processing tank; pressurizing the feed water in the processing tank; and providing the filtering apparatus with a negative pressure.

It is to be understood that both the foregoing general description and the following detailed description of the present invention are exemplary and explanatory and are intended to provide further explanation of the invention as claimed.

Advantageous Effect

According to the system and method for filtration of the present invention, the amount of the energy required for the filtering operation can be minimized, and thus both the reduction of the operation cost and the protection of the environment can be achieved.

Other advantages of the present invention will be described below in detail together with the related technical features.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE OF INVENTION

Hereinafter, the systems and methods for filtration according to the embodiments of the present invention will be described in detail with reference to the annexed drawings.

Figure 2:
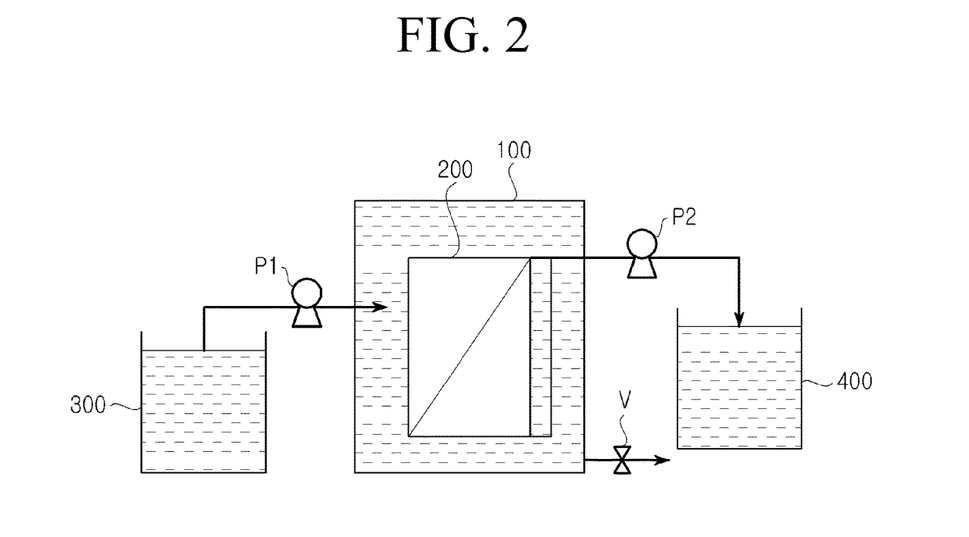
FIG. 2 schematically shows a filtration system according to one embodiment of the present invention.

FIG. 2 schematically shows a filtration system according to one embodiment of the present invention.

As illustrated in FIG. 2, the filtration system of the present invention comprises a processing tank 100, a filtering apparatus 200 in the processing tank 100, a feed water tank 300 containing the feed water to be supplied to the processing tank 100, a permeate tank 400 for storing the permeate produced by the filtering apparatus 200, a first pump P1 for supplying the feed water in the feed water tank 300 to the processing tank 100, and a second pump P2 for providing the filtering apparatus 200 with a negative pressure. The second pump P2 provides the filtering apparatus 200 with the negative pressure so that the filtering apparatus 200 can treat the feed water to produce the permeate, and forwards the permeate so produced to the permeate tank 400.

The inventors gave attention to the fact that, in the prior art, the energy consumed by the pump for supplying the feed water to be treated to the processing tank does not make any contribution to the actual filtering process, studied to find out the way to make use of the energy consumed by the pump for the actual filtering process, and finally reached the present invention.

According to the invention, the processing tank 100 is sealable so that the feed water in the processing tank 100 can be pressurized by the first pump P1 after the processing tank 100 is filled with the feed water.

The term "sealable processing tank" as used herein is defined as a processing tank which can prevent the feed water introduced therein through a feed water inlet from getting out of it excepting cases where the permeate produced from the feed water is discharged therefrom.

It is not required for the "sealable processing tank" of the present invention to be always kept sealed, and the "sealable processing tank" of the present invention includes a processing tank which can be optionally or temporarily opened.

For example, while the filtering process is not performed, a certain portion of the processing tank 100 can be opened so as to dispose the filtering apparatus 200 in the processing tank 100, and, for a certain reason (e.g., for cleaning the filtering apparatus 200), the drain valve V can be opened to discharge the feed water and/or sludge.

Since the processing tank 100 of the invention is sealable, the feed water in the processing tank 100 can be pressurized by continuously supplying further feed water to the processing tank 100 by means of the first pump P1 even after the processing tank 100 is filled with the feed water. The raised pressure of the feed water can initiate the filtering process or can be used for the filtering process. Consequently, the filtering apparatus 200 can produce the permeate with relatively low negative pressure supplied thereto, and thus the amount of the energy consumed by the second pump P2 can be reduced.

Figure 3:
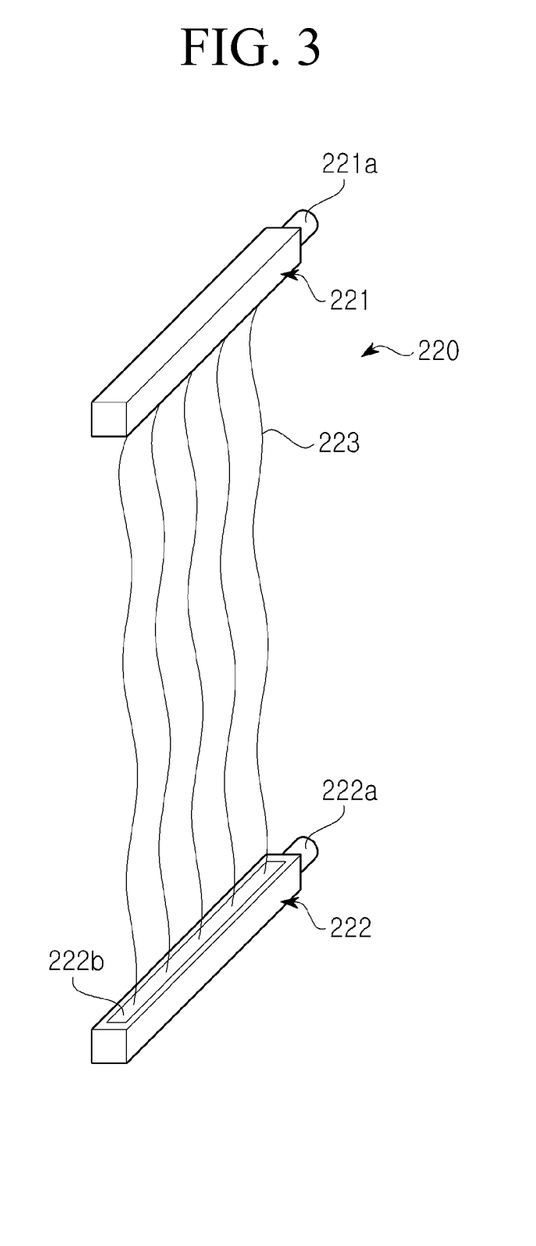
FIG. 3 is a perspective view of a hollow fiber membrane module according to one embodiment of the present invention.

Hereinafter, referring to FIG. 3 and FIG. 4, the filtering apparatus 200 of the invention will be described in more detail.

The filtering apparatus 200 of the invention comprises a plurality of hollow fiber membrane modules 220. As illustrated in FIG. 3, the hollow fiber membrane module 220 according to one embodiment of the invention comprises a first header 221 having a first collecting space, a second header 222 having a second collecting space, and a hollow fiber membrane 223 between the first and second headers 221, 222.

The polymer resin that can be used for manufacturing the hollow fiber membrane 223 includes at least one of polysulfone resin, polyethersulfone resin, sulfonated polysulfone resin, polyvinylidene fluoride (PVDF) resin, polyacrylonitrile (PAN) resin, polyimide resin, polyamideimide resin, and polyesterimide resin.

The hollow fiber membrane 223 may be a single-layer membrane or a composite membrane. If the hollow fiber membrane 223 is a composite membrane, it may comprise a tubular braid and a polymer thin film coated thereon. The tubular braid may be made of polyester or nylon.

One end of the hollow fiber membrane 223 is fixed to the first header 221 through the first fixing layer (not shown), and the other end thereof is fixed to the second header 222 through the second fixing layer 222b.

The lumen of the hollow fiber membrane 223 is in fluid communication with the first and second collecting spaces of the first and second headers 221, 222. Thus, when the negative pressure is supplied to the lumen of the hollow fiber membrane 223, the permeate passes through the hollow fiber membrane 223, flows into the first and second collecting spaces of the first and second headers 221, 222 via the lumen, and then is discharged through the first and second outlet ports 221a, 222a.

Figure 4:
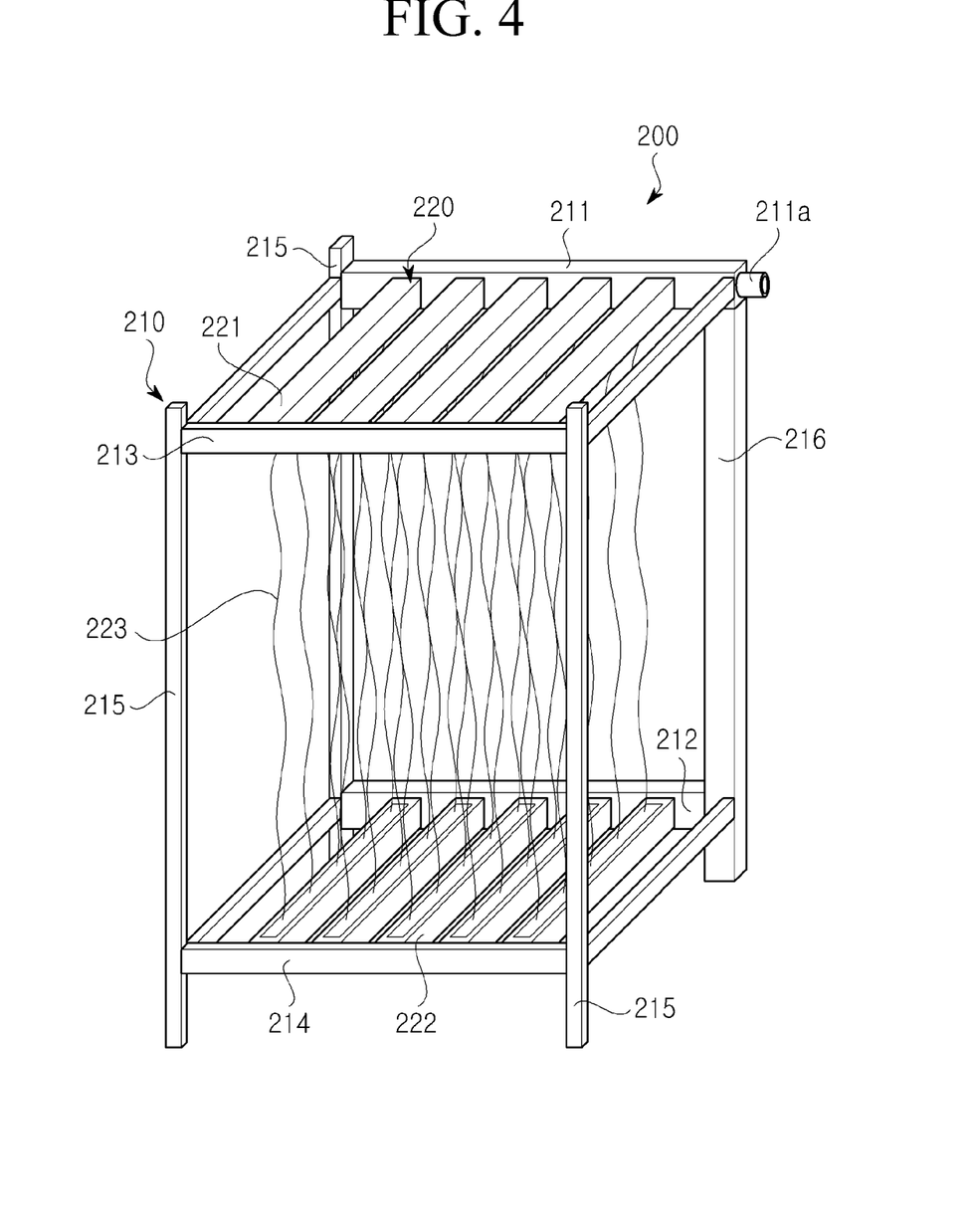
FIG. 4 is a perspective view of a filtering apparatus according to one embodiment of the present invention.

FIG. 4 is a perspective view of the filtering apparatus 200 according to one embodiment of the present invention.

As illustrated in FIG. 4, the filtering apparatus 200 of the invention comprises a frame structure 210 and at least one hollow fiber membrane module 220 installed in the frame structure 210.

The frame structure 210 comprises a first permeate pipe 211 which is in fluid communication with the first collecting space and a second permeate pipe 212 which is in fluid communication with the second collecting space. More particularly speaking, the first and second outlet ports 221a, 222a of the first and second headers 221, 222 of the hollow fiber membrane module 220 are inserted into the holes (not shown) of the first and second permeate pipes 211, 212, respectively.

The frame structure 210 further comprises the first and second cross bars 213, 214 to which the ends of the first and second headers 221, 222 opposite to the first and second outlet ports 221a, 222a are coupled respectively.

The first and second permeate pipes 211, 212 and the first and second cross bars 213, 214 are respectively supported by the three vertical bars 215 and one vertical pipe 216. The first and second permeate pipes 211, 212 are in fluid communication with each other through the vertical pipe 216.

The second pump P2 provides the first and second collecting spaces of the hollow fiber membrane module 220 with the negative pressure via the first and second permeate pipes 211, 212 respectively.

The filtering process is carried out by both the pressure of the feed water in the processing tank 100 which is raised by the first pump P1 and the negative pressure provided by the second pump P2 for the lumen of the hollow fiber membrane 223. As the filtering process is performed, the permeate passing through the hollow fiber membrane 223 is introduced into the first and second collecting spaces of the first and second headers 221, 222.

According to one embodiment of the invention, the permeate introduced in the first collecting space is directly forwarded to the first permeate pipe 211, and the permeate introduced in the second collecting space is also forwarded to the first permeate pipe 211 after passing through the second permeate pipe 212 and vertical pipe 216 sequentially. The permeate introduced in the first permeate pipe 211 is discharged out of the filtering apparatus 200 through the outlet port 211a.

Alternatively, the permeate introduced in the first and second collecting spaces respectively can be discharged out of the filtering apparatus 200 through the outlet port (not shown) of the vertical pipe 216 after forwarded to the vertical pipe 216 via the first and second permeate pipes 211, 212. In this case, the outlet port of the vertical pipe 216 may protrude from the vertical pipe 216 in parallel with the first and second permeate pipes 211, 212 so that it can be connected to the outlet pipe of the processing tank 100.

The filtering apparatus 200 of the invention may further comprise an aeration unit (not shown) disposed under the hollow fiber membrane module 220. The bubbles produced from the air belched out from the aeration unit rise in the feed water, thereby preventing or reducing the contamination of the hollow fiber membrane 223. Neither the structure of the such aeration unit nor the aeration method restricts the present invention.

The filtration method of the present invention comprises disposing a filtering apparatus 200 in a processing tank 100, supplying a feed water to be treated to the processing tank 100, pressurizing the feed water in the processing tank 100, and providing the filtering apparatus 200 with the negative pressure.

Figure 5:
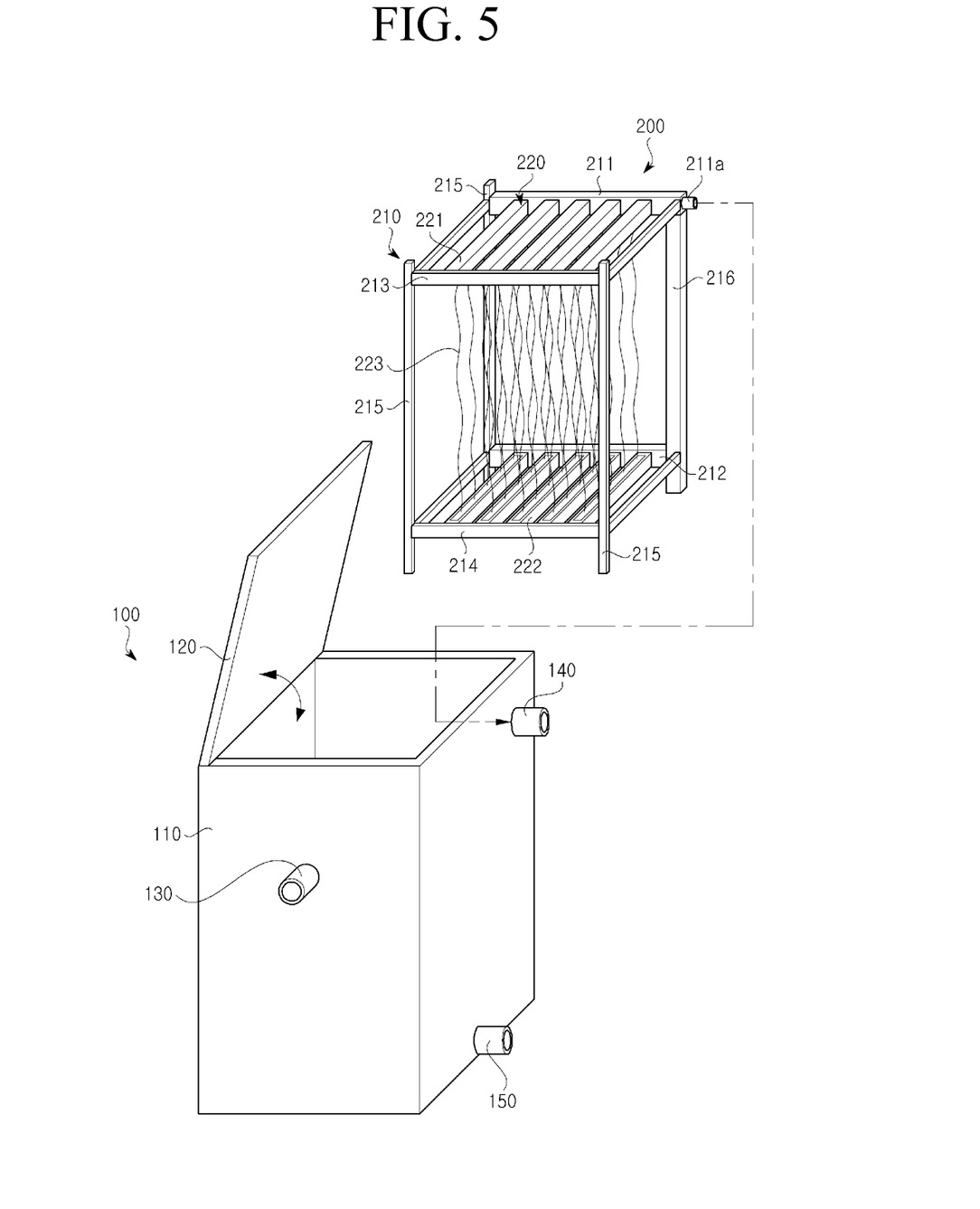
FIG. 5 schematically shows the way how the filtering apparatus of FIG. 4 is disposed in a processing tank.

Hereinafter, the filtration method of the invention will be explained in more detail with reference to FIG. 5. FIG. 5 schematically shows the way how the filtering apparatus 200 of FIG. 4 is disposed in the processing tank 100.

As illustrated in FIG. 5, the processing tank 100 according to one embodiment of the present invention comprises a body 110 having an upper portion which is open, a cover 120 to open or close the upper portion of the body 110, an inlet pipe 130 for receiving the feed water from the feed water tank 300, an outlet pipe 140 for discharging the permeate produced by the filtering apparatus 200 out of the processing tank 100, and a drain pipe 150 for discharging the feed water and/or sludge in the processing tank 100.

The cover 120 is opened to dispose the filtering apparatus 200 of the one embodiment of the invention in the processing tank 100. Then, the filtering apparatus 200 is inserted in the processing tank 100. At this moment, the outlet port 211a of the first permeate pipe 211 is connected to the outlet pipe 140 of the processing tank 100.

Subsequently, the cover 120 is closed and the valve V connected to the drain pipe 150 is controlled to close the drain pipe 150 so that the processing tank 100 is sealed. Although not shown, a sealing member can be interposed between the body 110 and cover 120 to prevent any leakage.

Then, the first pump P1 is operated to supply the feed water to treated from the feed water tank 300 to the processing tank 100 via the inlet pipe 130.

Since the processing tank 100 of the invention is sealed, even after the processing tank 100 is filled with the feed water, further feed water is supplied to the processing tank 100 by the first pump P1 so that the feed water in the processing tank 100 is pressurized.

Then, the second pump P2 is operated to provide the filtering apparatus 200 with the negative pressure. More particularly speaking, the negative pressure from the second pump P2 is supplied to the lumen of the hollow fiber membrane 223 after sequentially passing through the outlet pipe 140 of the processing tank 100, the outlet port 211a of the first permeate pipe 211, and the first and second collecting spaces of the first and second headers 221, 222.

As mentioned above, the pressure of the feed water which is raised during the pressurizing process can initiate the filtering process or can be used for the filtering process. Consequently, the filtering apparatus 200 can produce the permeate with relatively low negative pressure supplied thereto by the second pump P2, and thus the amount of the energy consumed by the second pump P2 can be reduced.

Hereinafter, the system and method for filtration according to another embodiment of the present invention will be described in more detail with reference to FIG. 6 and FIG. 7.

Figure 6:
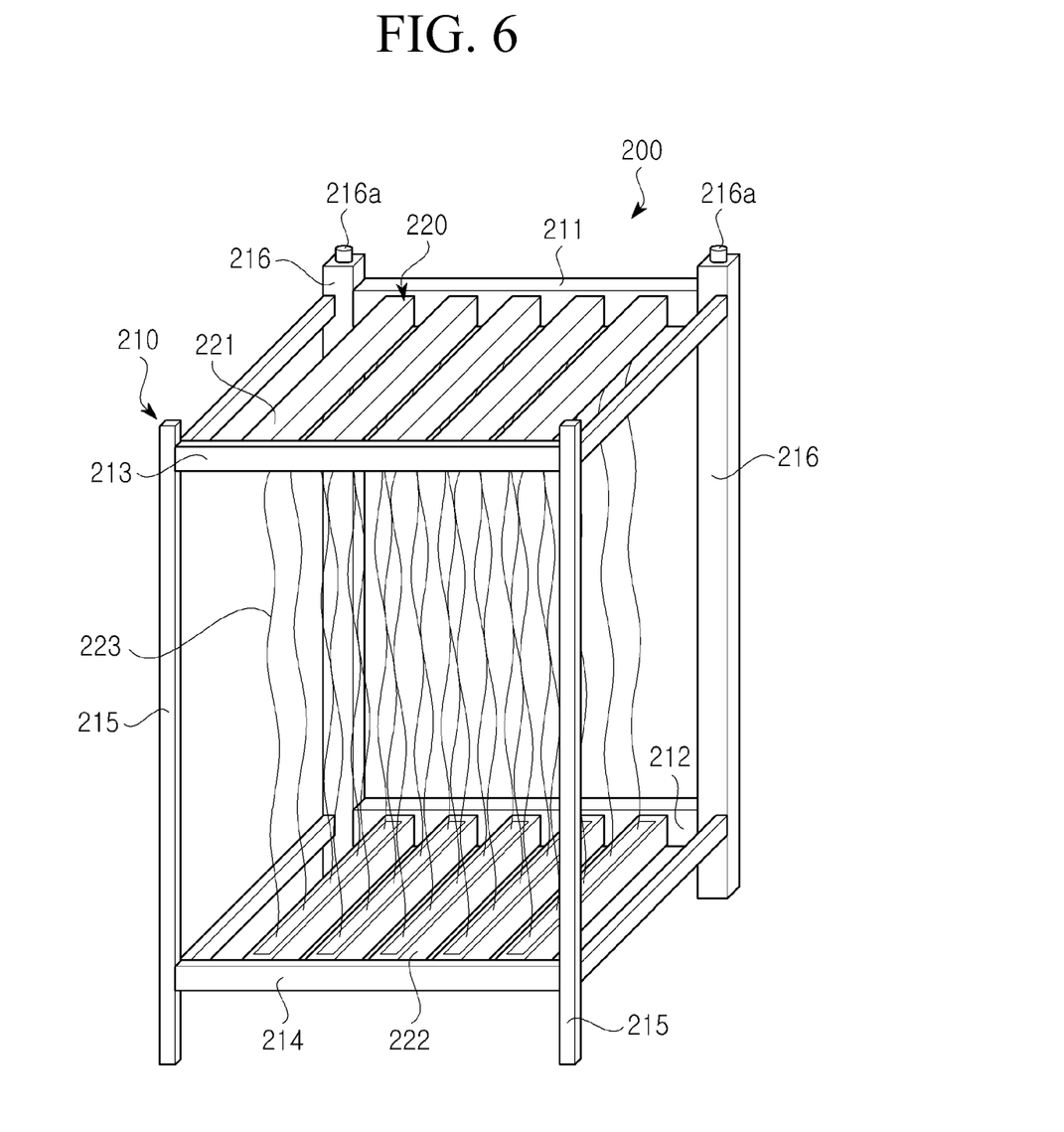
FIG. 6 is a perspective view of a filtering apparatus according to another embodiment of the present invention.
Figure 7:
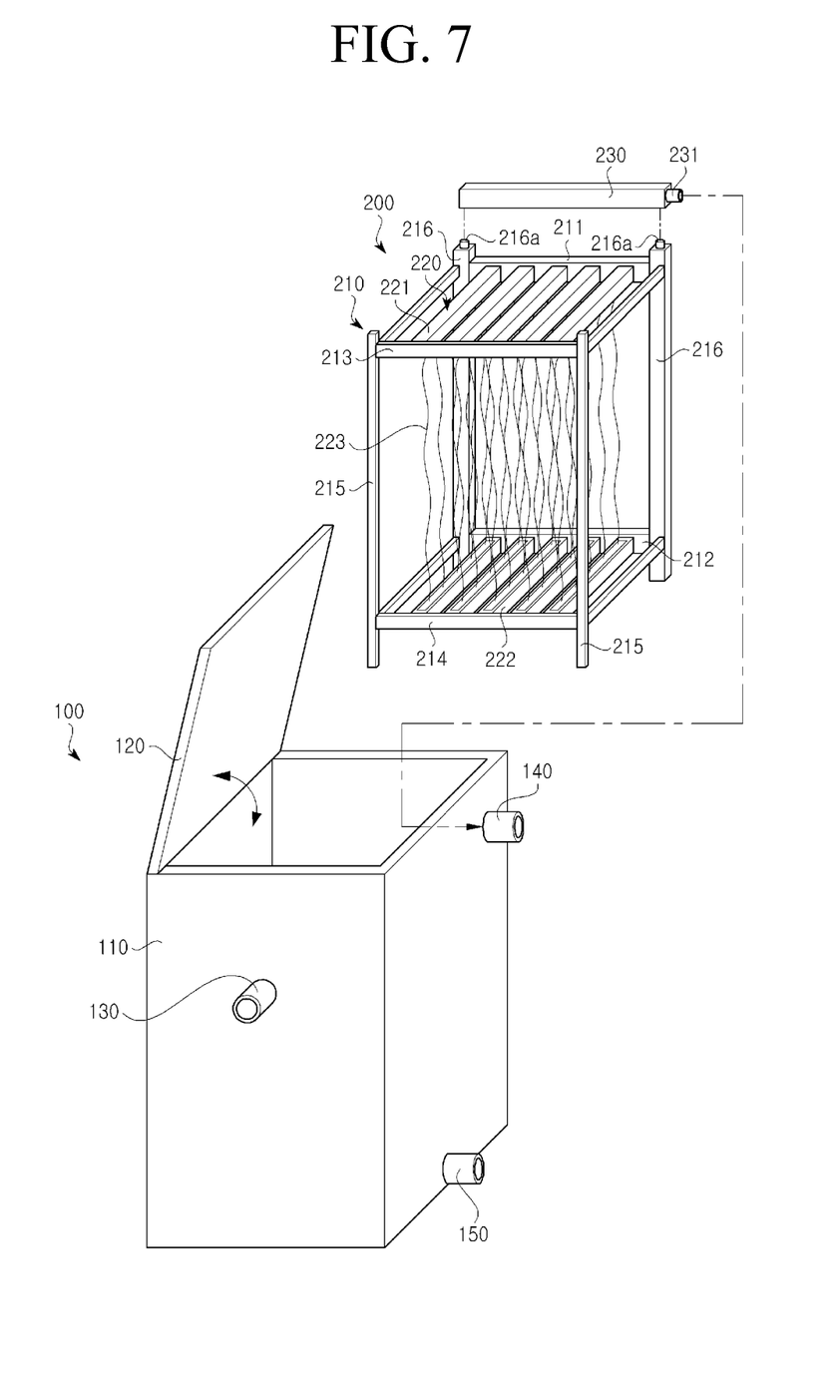
FIG. 7 schematically shows the way how the filtering apparatus of FIG. 6 is disposed in a processing tank.

FIG. 6 is a perspective view of a filtering apparatus 200 according to another embodiment of the present invention, and FIG. 7 schematically shows the way how the filtering apparatus 200 of FIG. 6 is disposed in a processing tank 100.

As illustrated in FIG. 6, the filtering apparatus 200 of FIG. 6 is same as that of FIG. 4 except that both ends of the first and second permeate pipes 211, 212 are combined to the first and second vertical pipes 216 respectively in such a manner that they are in fluid communication with each other so that the permeate produced by the hollow fiber membrane module 220 can be discharged out of the filtering apparatus 200 through the outlet ports 216a of the first and second vertical pipes 216.

As illustrated in FIG. 7, when the filtering apparatus 200 of FIG. 6 is disposed inside the processing tank 100, the outlet ports 216a of the first and second vertical pipes 216 are connected to the outlet pipe 140 of the processing tank 100 through the intermediate pipe 230 interposed therebetween. That is, the outlet ports 216a of the first and second vertical pipes 216 are inserted into the intermediate pipe 230, and the outlet port 231 of the intermediate pipe 230 is coupled to the outlet pipe 140 of the processing tank 100.

After the filtering apparatus 200 is disposed in the processing tank 100 in that way, the filtering process is carried out in the same way as that of the aforementioned embodiment.

Hereinafter, the system and method for filtration according to still further embodiment of the present invention will be described in more detail with reference to FIG. 8 to FIG. 10.

Figure 8:
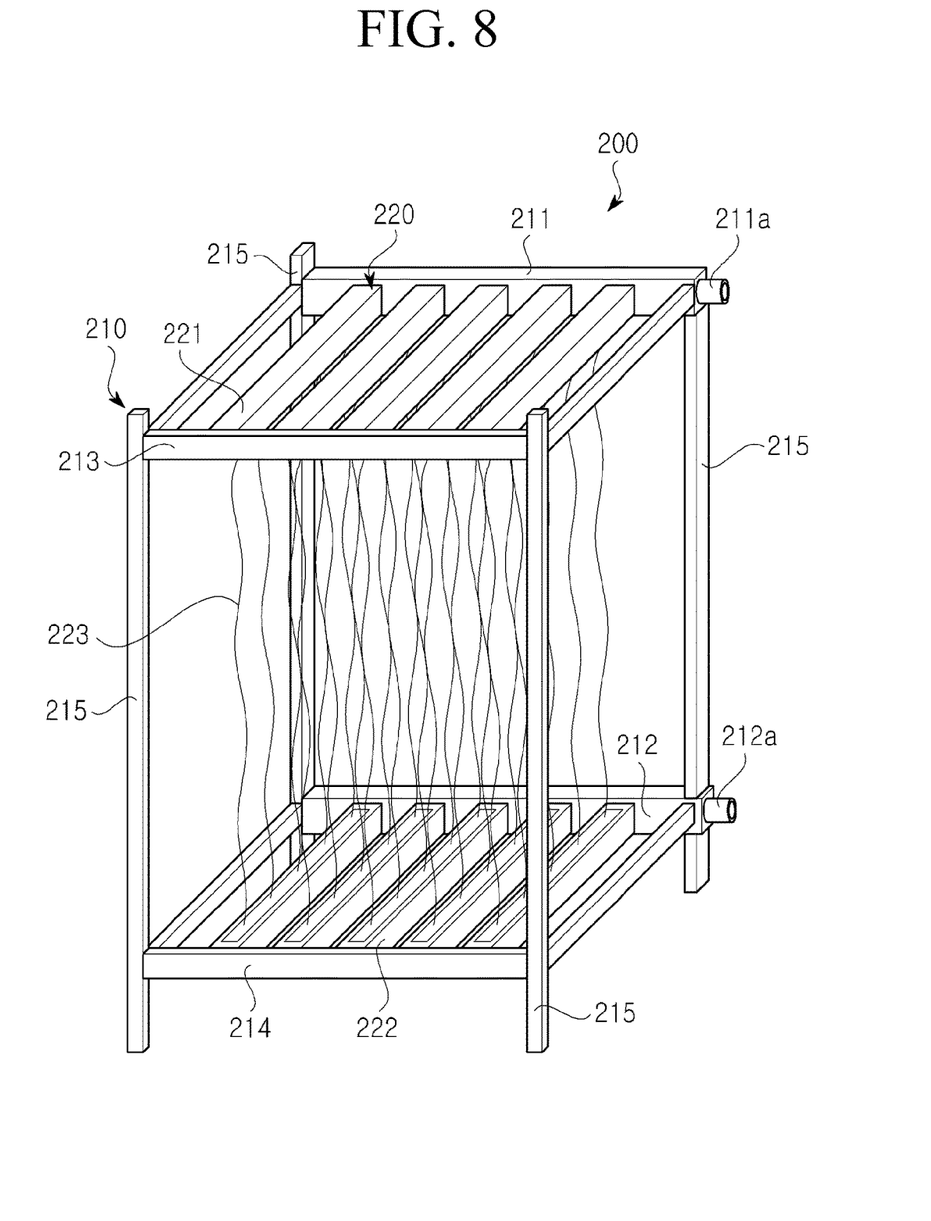
FIG. 8 is a perspective view of a filtering apparatus according to still further embodiment of the present invention.

FIG. 8 is a perspective view of the filtering apparatus 200 according to the still further embodiment of the present invention. As illustrated in FIG. 8, the filtering apparatus 200 of FIG. 8 is same as that of FIG. 4 except that the first and second permeate pipes 211, 212 having their own outlet ports 211a, 212a are supported by four vertical bars 215 and there is no vertical pipe to make them be in fluid communication with each other.

According to the filtering apparatus of FIG. 8, the permeate passing through the hollow fiber membrane 223 and entering the first collecting space of the first header 221 at the upper portion is discharged out of the filtering apparatus 200 only through the first outlet port 211a of the first permeate pipe 211. On the other hand, the permeate passing through the hollow fiber membrane 223 and entering the second collecting space of the second header 222 at the lower portion is discharged out of the filtering apparatus 200 only through the second outlet port 212a of the second permeate pipe 212.

Figure 9:
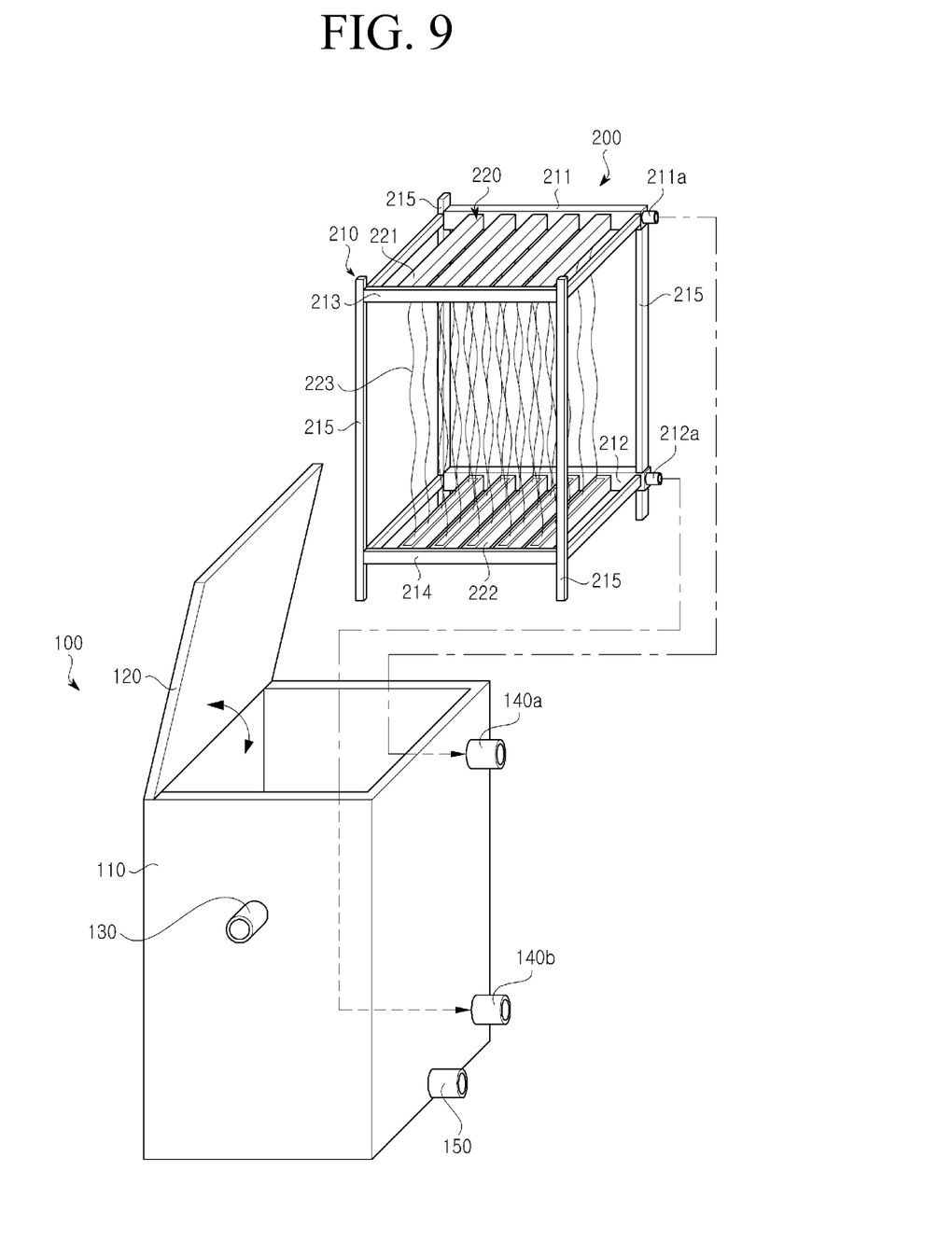
FIG. 9 schematically shows the way how the filtering apparatus of FIG. 8 is disposed in a processing tank.
Figure 10:
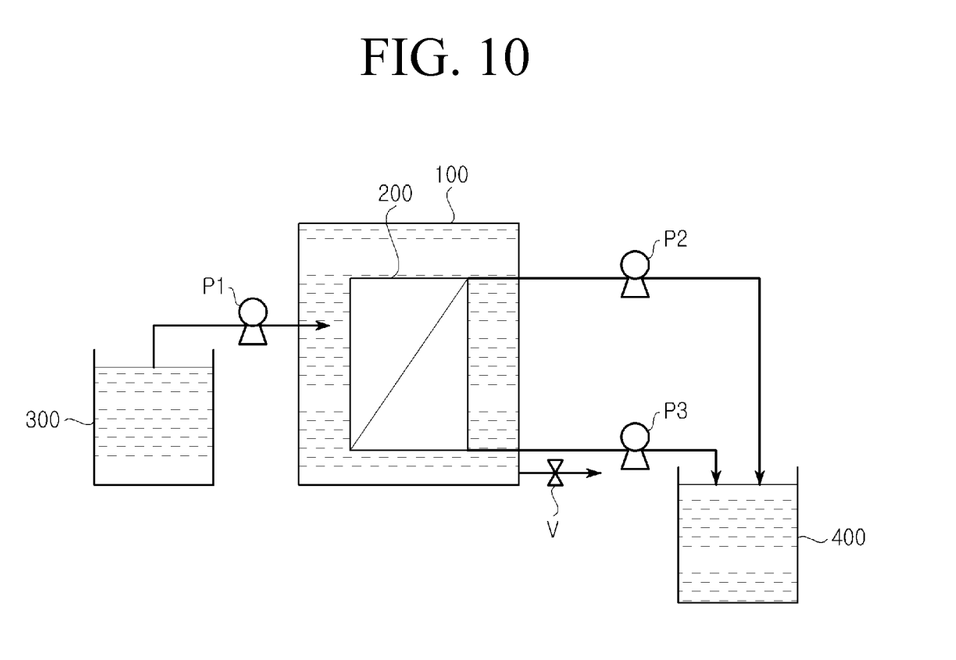
FIG. 10 schematically shows a filtration system according to the still further embodiment of the present invention.

FIG. 9 schematically shows the way how the filtering apparatus 200 of FIG. 8 is disposed in the processing tank 100. As illustrated in FIG. 9, the processing tank 100 comprises a body 110 having an upper portion which is open, a cover 120 to open or close the upper portion of the body 110, an inlet pipe 130 for receiving the feed water, the first and second outlet pipes 140a, 140b respectively provided at the upper and lower portions of the body 110 for discharging the permeate produced by the filtering apparatus 200 out of the processing tank 100, and a drain pipe 150 for discharging the feed water and/or sludge in the processing tank 100.

First, the cover 120 is opened to dispose the filtering apparatus 200 in the processing tank 100. Then, the filtering apparatus 200 is inserted in the processing tank 100. At this moment, the first and second outlet ports 211a, 212a of the first and second permeate pipes 211, 212 are connected to the first and second outlet pipes 140a, 140b of the processing tank 100 respectively.

Subsequently, the cover 120 is closed and the valve V connected to the drain pipe 150 is controlled to close the drain pipe 150 so that the processing tank 100 is sealed. A sealing member (not shown) can be interposed between the body 110 and cover 120 to prevent any leakage.

Hereinafter, referring to FIG. 10, the filtration method using the aforementioned filtration system will be explained in detail.

First, the first pump P1 is operated to supply the feed water to treated from the feed water tank 300 to the processing tank 100 via the inlet pipe 130. Since the processing tank 100 is sealed, further feed water is supplied to the processing tank 100 by the first pump P1 even after the processing tank 100 is filled with the feed water so as to pressurize the feed water in the processing tank 100.

Then, the second and third pumps P2, P3 are operated to provide the filtering apparatus 200 with the negative pressure. More particularly speaking, the negative pressure from the second pump P2 is supplied to the lumen of the hollow fiber membrane 223 after sequentially passing through the first outlet pipe 140a of the processing tank 100, the first outlet port 211a of the first permeate pipe 211, the first permeate pipe 211, and the first collecting space of the first header 221. At the same time, the negative pressure from the third pump P3 is supplied to the lumen of the hollow fiber membrane 223 after sequentially passing through the second outlet pipe 140b, the second outlet port 212a of the second permeate pipe 212, the second permeate pipe 212, and the second collecting space of the second header 222.

As mentioned above, the pressure of the feed water which is raised during the pressurizing process can initiate the filtering process or can be used for the filtering process. Consequently, the filtering apparatus 200 can produce the permeate with relatively low negative pressure supplied thereto by the second and third pumps P2, P3, and thus the amount of the energy consumed by the second and third pumps P2, P3 can be reduced.

Meanwhile, since the second header 222 of the hollow fiber membrane module 220 is positioned at relatively lower portion within the processing tank 100, in addition to the pressure provided by the first pump P1 and the negative pressure provided by the third pump P3, the water pressure based on the potential energy can also help the filtering process. Accordingly, the filtering process of the filtering apparatus 200 would not be encumbered even if the negative pressure is provided for the lumen of the hollow fiber membrane 223 via the second collecting space of the second header 222, which is lower than the negative pressure provided for the lumen of the hollow fiber membrane 223 via the first collecting space of the first header 221.

Consequently, the entire amount of the energy required for the filtering process can be further reduced by making the third pump P3 supply the negative pressure to the second header 222 of the hollow fiber membrane module 220, which is lower than the negative pressure supplied by the second pump P2 to the first header 221 of the hollow fiber membrane module 220.

The invention claimed is:

1. A filtration method comprising:
   disposing a filtering apparatus in a processing tank;
   supplying a feed water to be treated to the processing tank;
   pressurizing the feed water in the processing tank; and
   providing the filtering apparatus with a first negative pressure and a second negative pressure, wherein,
   the filtering apparatus comprises a plurality of hollow fiber membrane modules, each of the hollow fiber membrane modules comprising:
      an upper header having a first collecting space;
      a lower header disposed below the upper header, the lower header having a second collecting space; and
      a hollow fiber membrane between the upper and lower headers,
   each of the hollow fiber membrane modules is provided with both the first and second negative pressures simultaneously,
   the first and second negative pressures are simultaneously supplied to a lumen of the hollow fiber membrane via the first collecting space of the upper header and the second collecting space of the lower header, respectively, and
   a level of the second negative pressure is lower than a level of the first negative pressure.

* * * * *